Figure 1:
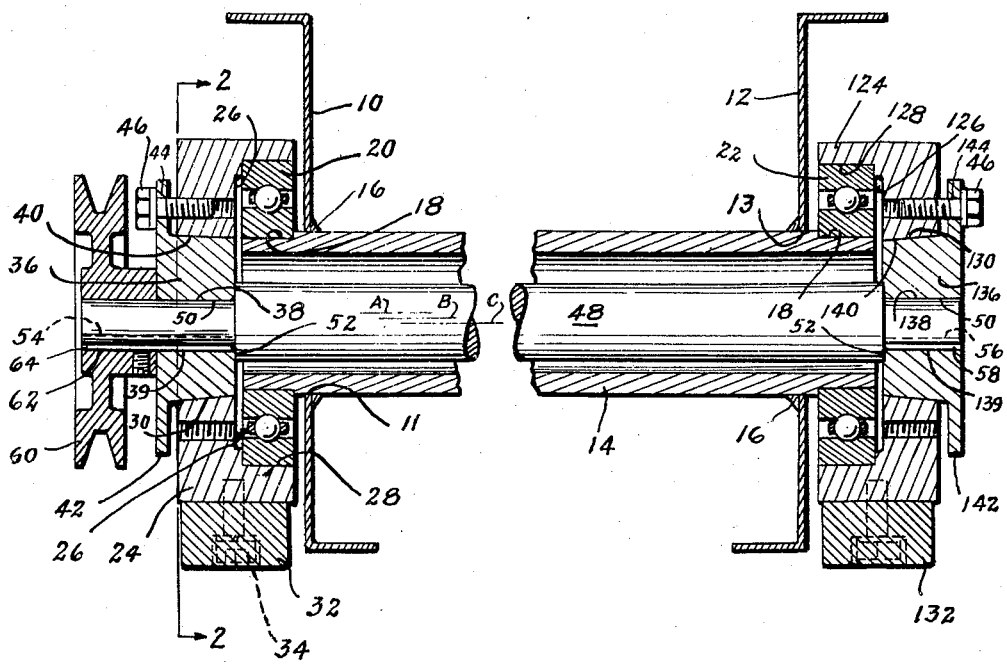

Sept. 8, 1959  A. K. FERRARA  2,902,868
VIBRATING EQUIPMENT
Filed June 4, 1956

INVENTOR
ACHILLE K. FERRARA
BY Ray Eilers ATT'Y.

United States Patent Office 2,902,868
                              Patented Sept. 8, 1959

2,902,868

VIBRATING EQUIPMENT

Achille K. Ferrara, Elmwood Park, Ill., assignor to Productive Equipment Company, Chicago, Ill., a corporation of Illinois Application June 4, 1956, Serial No. 589,126

6 Claims. (Cl. 74—87)

This invention relates to improvements in vibrating equipment. More particularly, this invention relates to improvement in high-speed vibrating screens.

It is therefore an object of the present invention to provide an improved high-speed vibrating screen.

In the separating and sizing of products by screens, it is desirable that those products be subjected to rapid vibrations of relatively small amplitude. In recognition of this fact, a number of high-speed vibrating screens have been proposed, and some of them have been used. One screen that has been used effectively and widely is disclosed by Lewis E. Soldan, Patent No. 2,267,143 which was issued December 23, 1941. The screens made in accordance with that patent have given excellent service and have been well received. The vibrating screen provided by the present invention retains many of the desirable structural features disclosed by that patent, but it is made so it is inexpensive.

In the vibrating screen disclosed by said patent, a tubular member of relatively light weight extends between the side walls of the screen frame; and bearing supports extend outwardly from those side walls. Anti-friction bearings are mounted on those bearing supports, and those bearings carry eccentric discs. The eccentric discs have balance wheels bolted to them, and those balance wheels are suitably keyed to a shaft which extends through the tubular member. A recess is provided in the outer face of each of the balance wheels, and the recess in the balance wheel at the driving end of the shaft accommodates a stub shaft that carries a pulley, while the recess in the balance wheel at the opposite end of the shaft accommodates a stub shaft blank. The eccentric discs and balance wheels of the vibrating screen disclosed by said patent have a number of openings which can be aligned with each other to receive bolts; and those discs and wheels can be set at a number of individually different positions to provide a number of individually different "throws." In addition weights can be secured to the discs and balance wheels at a number of different places. Moreover, the bearings, the eccentric discs and the balance wheels are encased within oil-tight housings. The combination of all these elements and features makes the high-speed vibrating screen of the said patent exceedingly useful and versatile. In some installations, however, the full versatility of the vibrating screen of the said patent is not needed; and a less expensive vibrating screen can be used. Thus, in some installations, a vibrating screen with just five or six individually different "throws" will suffice. The present invention provides a high-speed vibrating screen which can provide a small number of individually different "throws"; and it is therefore an object of the present invention to provide an inexpensive high-speed vibrating screen that can provide a small number of individually different "throws."

The present invention attains reduced cost by making the tubular member sturdy and rugged, and by using it as the support for the anti-friction bearings. In addition, the present invention attains reduced cost by welding the side walls directly to the tubular member. Further, the present invention reduces costs by eliminating the substantially oil-tight housings; and by reducing the number of parts, as by mounting the balance wheels directly on the bearings and by using eccentric tapered sleeves to secure those wheels to the shaft.

Other and further objects and advantages of the present invention should become apparent from an examination of the drawing and the accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 2:
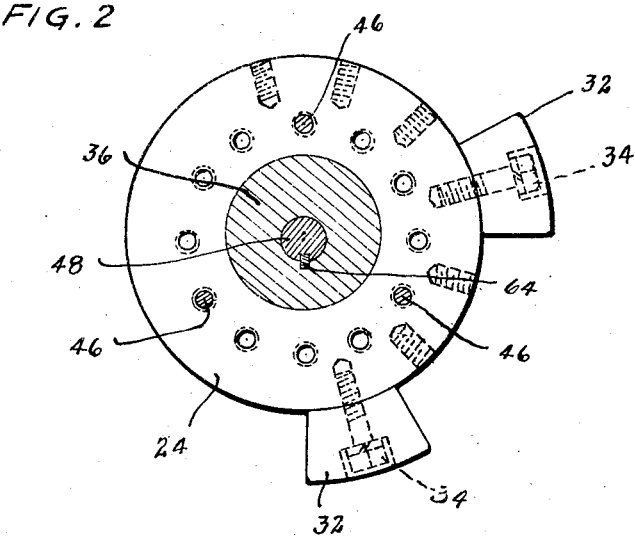

In the drawing,

Fig. 1 is a sectional view in end elevation of one form of high-speed vibrating screen that is made in accordance with the principles and teachings of the present invention, and Fig. 2 is a sectional view in side elevation of a portion of the vibrating screen of Fig. 1, and it is taken along the plane indicated by the line 2—2 in Fig. 1.

Referring to the drawing in detail, the numeral 10 denotes one of the side walls or side sheets of the screen frame used in the high-speed vibrating screen provided by the present invention. The upper and lower edges of that wall are bent at right angles to the plane of that wall to stiffen it. A rather large circular opening 11 is provided in the plane section of the wall 10. A side wall or side sheet 12, identical to the side wall 10, is provided at the opposite side of the screen frame provided by the present invention. That second side wall has the upper and lower edges thereof bent at right angles to its plane portion to provide stiffening of that plane portion. The side wall 12 has a large opening 13 through it; and the openings 11 and 13 will be aligned and concentric with each other whenever the plane sections of the walls 10 and 12 are in register with each other.

A heavy and sturdy tubular member 14 has the opposite ends thereof telescoped through, and extending beyond, the openings 11 and 13 of the side walls 10 and 12 respectively. Those side walls are solidly secured to the tubular member 14 by welds that are at the joints between the tubular member and the openings 11 and 13. The tubular member 14 provides full and ample resistance to rotation of each side-wall relative to the other, both about the axis of the tubular member 14 and also about an axis perpendicular to the axis of that member. The unitary supporting structure that is made by welding the side walls 10 and 12 to the tubular member 14 can be held by mounting pedestals of the type used in the art of high-speed vibrating screens. One such mounting pedestal is disclosed by Lewis E. Soldan, Patent No. 2,484,191 which was issued October 11, 1949; and another such mounting pedestal is disclosed by Lewis E. Soldan, Patent No. 2,693,331 which was issued November 2, 1954.

The outwardly projecting ends of that tubular member 14 are machined to have sections 18 of smaller diameters than the central portion of that tubular member. Those machined sections receive the inner races of anti-friction bearings 20 and 22; those inner races being pressed tightly onto the machined sections 18 so they remain stationary relative to those machined sections.

A balance wheel 24 of generally cylindrical configuration has a cylindrical recess 26 at one face thereof. That balance wheel has a second and larger-diameter recess 28; and the two recesses are contiguous. The larger-diameter recess 28 receives the outer race of the anti-friction bearing 20; and the outer end of the outer race will abut the bottom of the larger-diameter recess 28. The balance wheel 24 is provided with tapered opening 30.

The balance wheel 24 has the periphery thereof concentric with an axis that is denoted by the letter A, the tapered surface 30 is concentric with an axis denoted by the letter B, and the recesses 26 and 28 are concentric with an axis denoted by the letter C. The axis A is at the geometric center of the balance wheel 24, the axis B is at the geometric center of the frusto-conical recess formed by the tapered surface 30, and the recess C is at the geometric center of the machined surfaces 18 on the tubular member 14 and is at the geometric center of the anti-friction bearing 20.

Weights 32 are selectively secured to the periphery of the balance wheel 24 by bolts 34 which extend radially through those weights and seat in radial openings in the balance wheel 24. A number of other radial openings, as shown, are provided adjacent the periphery of the balance wheel 24, and those openings permit the weights 32 to be set at circumferentially spaced positions around the periphery of the balance wheel 24.

The numeral 124 denotes a balance wheel that is similar to the balance wheel 24. That balance wheel has an eccentric recess 126, and also has a larger-diameter eccentric recess 128. These recesses are the counterparts of the recesses 26 and 28 in the balance wheel 24. An eccentric tapered opening 130 is provided in the balance wheel 124; and weights 132 and bolts 134 are provided for that balance wheel. The axis A is coincident with the geometric axis of the balance wheel 124, the axis B is coincident with the geometric axis of the tapered surface 130, and the axis C is coincident with the geometric axis of the recesses 126 and 128.

An eccentric taper lock 36 telescopes into the frusto-conical opening 30 of balance wheel 24, and an eccentric taper lock 136 telescopes into the frusto-conical opening 130 of balance wheel 124. Each of the eccentric taper locks 36 and 136 has a central opening; and those openings are denoted by the numerals 38 and 138, respectively. Those openings are concentric with the axis A. A keyway 39 is provided in the eccentric taper lock 36, and that keyway is contiguous with the concentric central opening 38. A keyway 139 is provided in the eccentric taper lock 136, and that keyway is contiguous with the concentric opening 138.

The taper lock 36 has a frusto-conical surface 40 which is concentric with the axis B; and therefore that surface is eccentric of the axis A. Similarly, the taper lock 136 has a frusto-conical surface 140 that is concentric with the axis B; and therefore that surface is eccentric of the axis A. These frusto-conical surfaces are complementary to the internal frusto-conical surfaces 30 and 130 of the balance wheels 24 and 124, respectively. Each of the eccentric taper locks 36 and 136 is provided with a radially-extending flange; and those flanges are denoted by the numerals 42 and 142 respectively. Openings 44 and 144, respectively, are provided in those radial flanges to receive bolts 46. Those bolts extend through the openings 44 and 144 and seat in threaded openings in the balance wheels 24 and 124. In the particular modification shown, three such bolts are provided; and, as indicated particularly in Fig. 2, those bolts are spaced in such a way that the balance wheels 24 and 124 and the eccentric taper locks 36 and 136 can be set in different positions relative to each other.

An elongated shaft 48 is provided with reduced diameter sections 50 adjacent the ends thereof. Those reduced diameter sections define radially directed shoulders 52 at points spaced inwardly from the ends of that shaft. The shaft 48 is concentric with axis A throughout; and the reduced diameter ends 50 thereof telescope into the concentric openings 38 and 138 in the taper locks 36 and 136. A keyway 54 is provided at the left hand end of the shaft 48, and a keyway 56 is provided at the right hand end of that shaft. The principal difference between the keyways 54 and 56 is that the keyway 54 is longer than the keyway 56. A key 58 extends into the keyway 56 and into the keyway 139 of the eccentric taper lock 136. That key fixedly holds that taper lock against rotation relative to the shaft 48.

A pulley 60 telescopes over the left hand end of the shaft 48 after the taper lock 36 has been set in position. This pulley can be suitably connected to a source of power, as for example an electric motor, by a belt; and a V-belt is preferred. The pulley 60 has a keyway 62 therein, and a key 64 extends into the keyways 39, 54 and 62 of the taper lock 36, the shaft 48 and the pulley 60, respectively.

In assembling the high-speed vibrating screen provided by the present invention, the tubular member 14 is welded to the side sheets 10 and 12. Thereafter, the anti-friction bearings 20 and 22 are pressed onto the reduced diameter sections 18 of that tubular member. At such time, the balance wheels 24 and 124 can be telescoped onto the outer races of the anti-friction bearings 20 and 22. The taper lock 36 is then set on the reduced diameter portion 50 at the left hand end of the shaft 48, and the key 64 is telescoped into position to lock that shaft and taper lock together. The pulley 60 is thereupon telescoped onto the left hand end of the shaft 48; care being taken to align the keyway 62 in that pulley with the key 64. The assembly of the shaft 48 with the balance wheel 24, the taper lock 36 and the pulley 60 will most conveniently be done before the shaft 48 is telescoped into the tubular member 14. However, once that assembly has been made, the right hand end of the shaft 48 can be telescoped through the tubular member 14, and the taper lock 136 can be set on that end. The frusto-conical surface 40 of the taper lock 36 will be rotated until the desired eccentricity is set; and suitable marking will be provided on the taper lock 36 and balance wheel 24 to make this setting simple and certain. Thereafter, the bolts 46 can be seated in the threaded openings in the balance wheel 24 to hold that balance wheel and the taper lock 36 against relative rotation. Similarly, the taper lock 136 will be rotated relative to the shaft until the keyways 56 and 139 are aligned, and thereupon the key 58 will be driven home. At this time, an eccentricity identical to that set by the balance wheel 24 and the taper lock 36 will be set by the balance wheel 124 and the taper lock 136; and thereupon the bolts 46 can pass through the openings 144 in the radial flange 142 and seat in the corresponding openings in the balance wheel 124. The last step in the assembling operation is the mounting of the weights 32 and 132, and this is easily done by passing the bolts 34 through them and then into the radial openings at the periphery of the balance wheels 24 and 124.

One of the weights 32, and one of the weights 132, are fixedly secured to the balance wheels 24 and 124 respectively. In the particular embodiment shown, the fixed weights are shown in section in Fig. 1, and the movable weight 32 is shown at the right of Fig. 2. For maximum "throw," the movable weights 32 and 132 will be set immediately adjacent the fixed weights, and the taper locks and balance wheels will be rotated to provide maximum eccentricity. For minimum "throw," the movable weights 32 and 132 are set opposite to the fixed weights; and the smallest eccentricity is set by the taper locks and balance wheels. By having twelve axial openings for the three bolts 46, and by having seven radial openings for the bolts 34, the disclosed embodiment is able to provide six individually different "throws" ranging from six hundred and seventy-five ten thousandths of an inch to twenty-five hundredths of an inch.

When the shaft 48 first starts to rotate, the axis A will move eccentrically; the axis C serving as the instantaneous center of rotation. However, as that shaft gets up the speed it will rotate concentrically about the axis A, thereby providing positive eccentric movement of the axis C and of the side walls 10 and 12. This movement enables the screen frame to apply the desired shaking action to the contents of the vibrating screen. The amplitude of the vibrations imparted to the contents of the vibrating screen can be varied by shifting the position of the movable weights 32 and 132 and by making corresponding adjustments in the relative positions of the taper locks and balance wheels, all as described above.

The present machine is thus enabled to provide a limited number of individually different "throws" for the contents of the screen. In doing so, it is not as versatile as the vibrating screen disclosed by Lewis E. Soldan, Patent No. 2,267,143 which was issued December 23, 1941, but it is considerably less expensive than that screen. Consequently, there is a place for this vibrating screen in locations where low cost operations are needed. While the vibrating screen of the present invention does not provide a large number of individually different "throws," it does provide the positive eccentric action which has been found to be so very important.

Whereas the drawing and accompanying description have shown and described a preferred embodiment of the present invention, it should be apparent to those skilled in the art that various changes may be made in the form of the invention without affecting the scope thereof.

What I claim is:

1. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves, said structural element being a tube that projects beyond said side walls and that extends into said inner races of said bearings, said tapered openings in said weight-carrying discs being disposed axially beyond said outer races of said bearings, the coaxial openings in said sleeves being eccentric of the external tapers on said sleeves, said fasteners being screws, said shaft rotating freely within said tube.

2. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves, said tapered openings in said weight-carrying discs being disposed axially beyond said outer races of said bearings, the coaxial openings in said sleeves being eccentric of the external tapers on said sleeves, said fasteners being screws.

3. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves, said weight-carrying discs being thick sections of a right circular cylinder and each of said weight-carrying discs having recesses formed therein to receive one of said bearings, said recesses being in confronting relation.

4. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves, each of said weight-carrying discs having a radially extending web and having an axially extending rim, said rim being of varying thickness to make said recess eccentric of the periphery of said weight-carrying disc.

5. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves, each of said weight-carrying discs having a radially extending web and having an axially extending rim, said sleeves engaging said webs of said weight-carrying discs and having the inner faces thereof substantially co-planar with said webs.

6. A vibrating device which comprises a pair of spaced apart side walls, a structural element extending between and being fixed relative to said side walls, a pair of anti-friction bearings, said bearings being disposed outwardly of said side walls and having their inner races fixed relative to said side walls, weight-carrying discs mounted on and rotatable with the outer races of said anti-friction bearings, each of said weight-carrying discs having a tapered opening therethrough adjacent the center thereof, said openings being eccentric of said outer races of said bearings, each of said weight-carrying discs including a movable weight that can be set at different circumferentially-spaced positions on said weight-carrying disc, sleeves with external tapers complementary to the tapers of said openings in said weight-carrying discs, said sleeves being coaxial, a shaft that extends into said sleeves and holds said sleeves for conjoint rotation, said movable weights being adapted to be set at different circumferentially-spaced positions on said weight-carrying discs to provide different "throws" for said vibrating device, and fasteners to releasably secure said weight-carrying discs to said sleeves.

References Cited in the file of this patent

UNITED STATES PATENTS

| | | |
|---|---|---|
| 276,292 | Seymour | Apr. 24, 1883 |
| 1,693,940 | Robins | Dec. 4, 1928 |
| 2,267,143 | Soldan | Dec. 23, 1941 |
| 2,556,151 | Bremer | June 5, 1951 |
| 2,677,967 | Galbraith | May 11, 1954 |